US010753468B2

(12) United States Patent
 Krishnam E.N.V et al.

(10) Patent No.: US 10,753,468 B2
(45) Date of Patent: Aug. 25, 2020

(54) AUXILIARY TRANSMISSION ACTUATION MECHANISM IN A MANUAL DUAL CLUTCH POWER TRANSMISSION UNIT OF A VEHICLE

(71) Applicant: Mahindra and Mahindra Limited, Tamil Nadu (IN)

(72) Inventors: Raju Krishnam E.N.V, Tamil Nadu (IN); Srinivasa Rao K.V.V, Tamil Nadu (IN); Amit More, Tamil Nadu (IN)

(73) Assignee: MAHINDRA AND MAHINDRA LIMITED, Tamil Nadu (IN)

( * ) Notice: Subject to any disclaimer, the term of this patent is extended or adjusted under 35 U.S.C. 154(b) by 22 days.

(21) Appl. No.: 16/329,583

(22) PCT Filed: Aug. 31, 2017

(86) PCT No.: PCT/IN2017/050372
§ 371 (c)(1),
(2) Date: Feb. 28, 2019

(87) PCT Pub. No.: WO2018/042457
PCT Pub. Date: Mar. 8, 2018

(65) Prior Publication Data
US 2019/0195355 A1    Jun. 27, 2019

(30) Foreign Application Priority Data
Aug. 31, 2016 (IN) .............................. 201641029831

(51) Int. Cl.
*F16H 61/28* (2006.01)
*F16H 63/32* (2006.01)
(Continued)

(52) U.S. Cl.
CPC .............. *F16H 61/28* (2013.01); *F16D 11/14* (2013.01); *F16D 21/04* (2013.01); *F16H 3/08* (2013.01);
(Continued)

(58) Field of Classification Search
CPC .......... F16H 61/28; F16H 11/14; F16H 61/12; F16H 61/688; F16H 63/64; F16D 21/04
See application file for complete search history.

(56) References Cited

U.S. PATENT DOCUMENTS

| 8,105,203 B2 * | 1/2012 | Ishii | F16H 3/006 |
| | | | 477/127 |
| 2008/0184846 A1 * | 8/2008 | Jackson | F16H 3/006 |
| | | | 74/732.1 |

(Continued)

FOREIGN PATENT DOCUMENTS

CN           102478112 A      5/2012

OTHER PUBLICATIONS

International Search Report dated Nov. 1, 2017, issued in corresponding International Application No. PCT/IN2017/050372, citing the above references.

*Primary Examiner* — David M Fenstermacher
(74) *Attorney, Agent, or Firm* — Hauptman Ham, LLP

(57) ABSTRACT

Auxiliary transmission actuation mechanism 200 in a power transmission unit of a vehicle includes a transmission actuating gear 202, a gear driven bush 204, a gear actuating means 206, a shift fork 208, a shift rail 210, a clutch control valve actuating arm 212, a rail shifting means 214. The transmission actuating gear 202 is used to drive at least one of an even shaft and an odd shaft which in turn drives an output shaft through gears thereby propelling the vehicle when at least one of a dual clutch unit and a hydraulic system of vehicle is not functioning. The clutch control valve actuating arm 212 is adapted to engage a movable member
(Continued)

of a clutch control valve assembly 100V thereby actuating clutch control valve 100V to de-actuate the dual clutch unit.

9 Claims, 13 Drawing Sheets

(51) Int. Cl.

| | | |
|---|---|---|
| *F16H 63/34* | (2006.01) | |
| *F16H 61/688* | (2006.01) | |
| *F16H 61/12* | (2010.01) | |
| *F16H 63/30* | (2006.01) | |
| *F16D 11/14* | (2006.01) | |
| *F16D 21/04* | (2006.01) | |
| *F16H 3/08* | (2006.01) | |
| *F16H 61/16* | (2006.01) | |
| *F16H 59/14* | (2006.01) | |
| *F16H 61/32* | (2006.01) | |

(52) U.S. Cl.
CPC ............ *F16H 61/12* (2013.01); *F16H 61/16* (2013.01); *F16H 61/688* (2013.01); *F16H 63/30* (2013.01); *F16H 63/32* (2013.01); *F16H 63/34* (2013.01); *B60Y 2400/402* (2013.01); *F16H 2003/0803* (2013.01); *F16H 2059/145* (2013.01); *F16H 2061/1224* (2013.01); *F16H 2061/1268* (2013.01); *F16H 2061/323* (2013.01); *F16H 2306/40* (2013.01)

(56) References Cited

U.S. PATENT DOCUMENTS

| | | | |
|---|---|---|---|
| 2009/0095102 A1* | 4/2009 | Koga | F16H 61/688 74/336 R |
| 2009/0137358 A1* | 5/2009 | Braford | F16H 3/08 475/271 |
| 2009/0151496 A1 | 6/2009 | Garabello et al. | |
| 2009/0165584 A1* | 7/2009 | Ishii | F16H 61/0246 74/336 R |
| 2010/0081536 A1* | 4/2010 | Braford, Jr. | F16H 3/097 475/303 |
| 2011/0306456 A1* | 12/2011 | Mellet | F16H 3/006 475/198 |
| 2013/0081491 A1* | 4/2013 | Arai | F16H 3/08 74/331 |
| 2013/0291670 A1* | 11/2013 | Baldwin | F16H 3/006 74/329 |
| 2015/0128736 A1* | 5/2015 | Hedman | F16H 3/091 74/330 |

* cited by examiner

AUXILIARY TRANSMISSION ACTUATION MECHANISM IN A MANUAL DUAL CLUTCH POWER TRANSMISSION UNIT OF A VEHICLE

CROSS REFERENCE TO RELATED APPLICATION

The present application is a national stage filing under 35 U.S.C § 371 of PCT application number PCT/IN2017/050372 filed on Aug. 31, 2017 which is based upon and claims the benefit of priority to Indian Provisional Application 201641029831 filed on Aug. 31, 2016, the contents of which are incorporated herein by reference in their entireties.

TECHNICAL FIELD

The embodiments herein generally relate to dual clutch transmission in vehicles and more particularly, to an auxiliary transmission actuation mechanism (can be considered as tow start mechanism/manual transmission starting mechanism) in a manual dual clutch power transmission unit of a vehicle (tractor, constructional vehicle and the like), which actuates the power transmission unit (drives an output shaft of a multi-speed transmission unit in the power transmission unit) therein to transmit the power from an engine to the wheels of the vehicle thereby propelling the vehicle when at least one of a hydraulic dual clutch unit (dual wet clutch) of the power transmission unit and a hydraulic system of the vehicle is not functioning or working.

BACKGROUND

Generally, a power transmission system of a vehicle is used for transmitting power from an engine or an electric motor to the wheels of the vehicle for propelling the vehicle. A conventional dual clutch power transmission system in a vehicle includes a dual clutch unit, a first input shaft coupled to an odd clutch unit of the dual clutch unit, a second input shaft coupled to an even clutch unit of the dual clutch unit, an output shaft, a plurality of odd drive gears (first drive gear, third drive gear and fifth drive gear) are adapted to be rotatably mounted/connected to the first input shaft at corresponding predetermined positions, a plurality of even drive gears (second drive gear, fourth drive gear and sixth drive gear) are adapted to be rotatably mounted/connected to the second input shaft at corresponding predetermined positions, a plurality of odd driven gears (first driven gear, third driven gear and fifth driven gear) are adapted to be rotatably mounted/connected the output shaft at corresponding predetermined positions, a plurality of even driven gears (second driven gear, fourth driven gear and sixth driven gear) are adapted to be mounted onto the output shaft at corresponding predetermined positions, an electro-hydraulic control valve block and may include other standard components as present in a standard power transmission system. The first input shaft is co-axial to the second input shaft. The second input shaft is a hollow shaft thereby enabling the first input shaft to be provide inside the second input shaft. The first input shaft and the second input shaft is parallel to the output shaft. The electro-hydraulic control valve block control the dual clutch unit. The elector-hydraulic control valve block is efficient in controlling the dual clutch unit. However, the elector-hydraulic control valve block is subjected (prone) to errors due to malfunctioning of some electrical and/or electronic components/device.

Conventional solutions include an electrical and/or electronic arrangement which allows the operator (driver) to press a limp home mode button thereby enabling the operator to drive the vehicle to a service station for servicing the dual clutch unit and/or the hydraulic system. However, the aforementioned electrical and/or electronic arrangement is subjected (prone) to errors due to malfunctioning of some electrical and/or electronic components/devices.

Therefore, there exists a need for an auxiliary transmission actuation mechanism (can be considered as tow start mechanism/manual transmission starting mechanism) in a manual dual clutch power transmission unit of a vehicle, which obviates the aforementioned drawbacks.

OBJECTS

The principal object of an embodiment of this invention is to provide an auxiliary transmission actuation mechanism (can be considered as tow start mechanism/manual transmission starting mechanism) in a manual dual clutch power transmission unit of a vehicle (tractor, constructional vehicle and the like), which actuates the power transmission unit (drives an output shaft of a multi-speed transmission unit in the power transmission unit) therein to transmit the power from an engine to the wheels of the vehicle thereby propelling the vehicle when at least one of a hydraulic dual clutch unit (dual wet clutch) of the power transmission unit and a hydraulic system of the vehicle is not functioning or working.

These and other objects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The embodiments of the invention are illustrated in the accompanying drawings, throughout which like reference letters indicate corresponding parts in the various figures. The embodiments herein will be better understood from the following description with reference to the drawings, in which.

DETAILED DESCRIPTION

Figure 1:
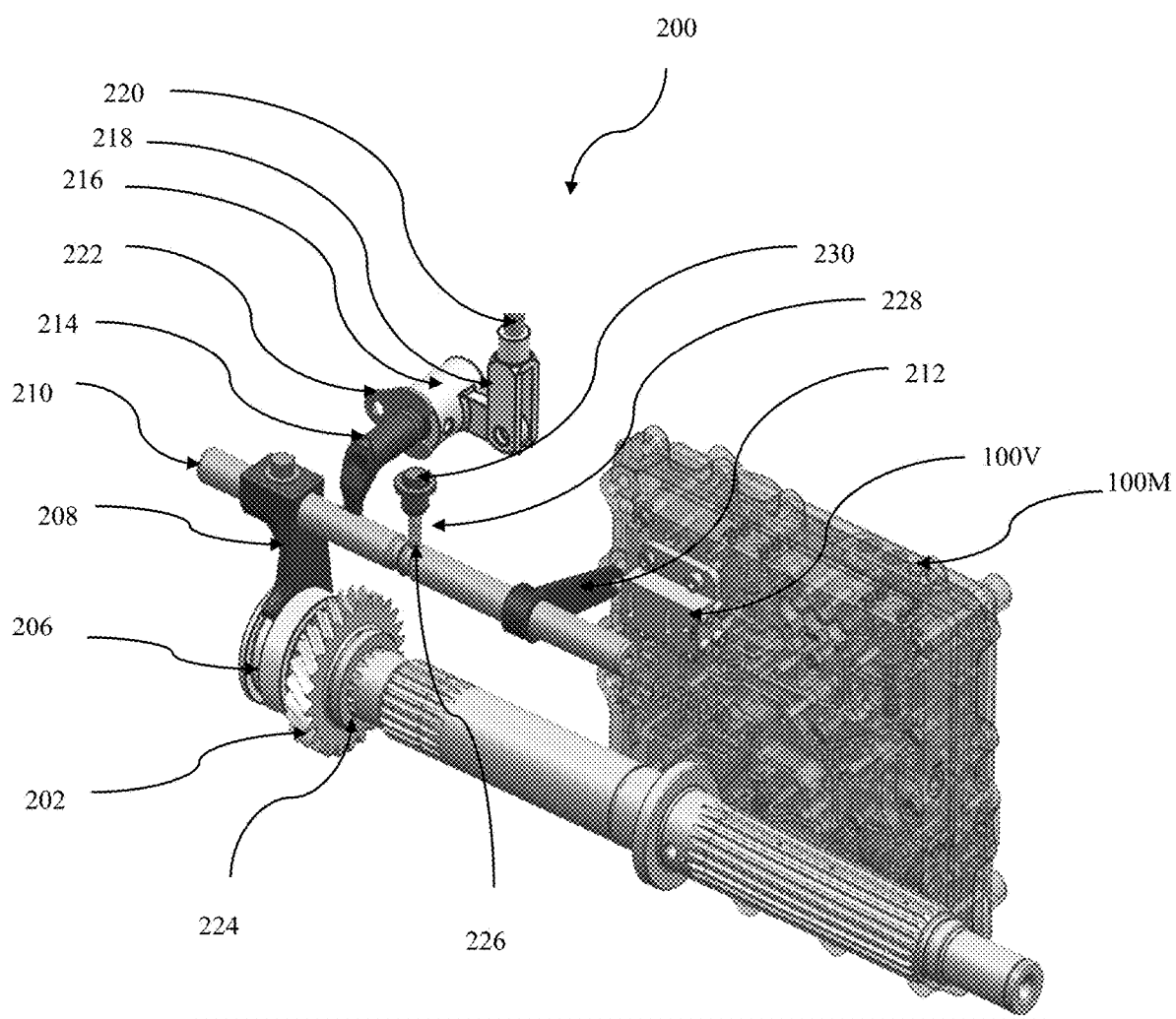
FIG. 1 depicts a perspective view of an auxiliary transmission actuation mechanism in a power transmission unit of a vehicle, according to an embodiment of the invention as disclosed herein.
Figure 2:
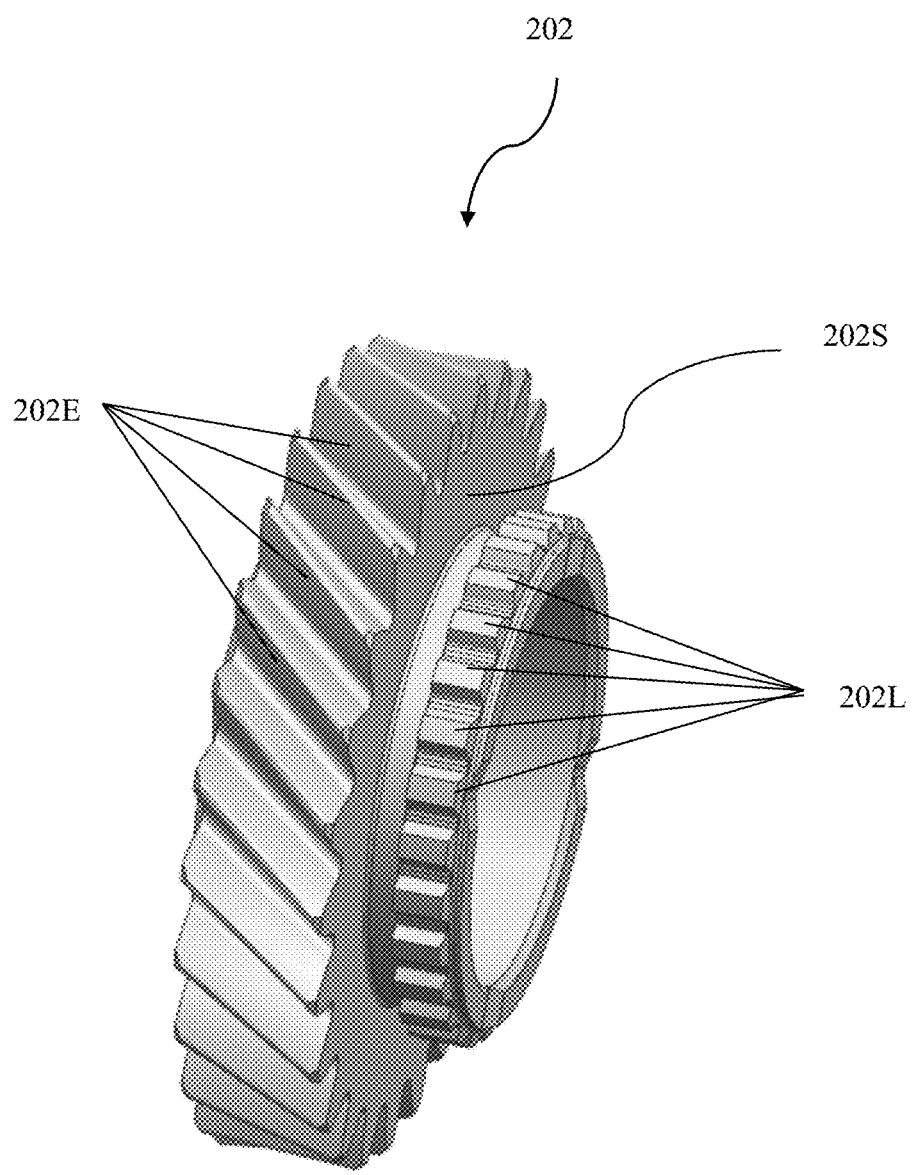
FIG. 2 depicts another perspective view of the transmission actuating gear, according to an embodiment of the invention as disclosed herein.
Figure 3:
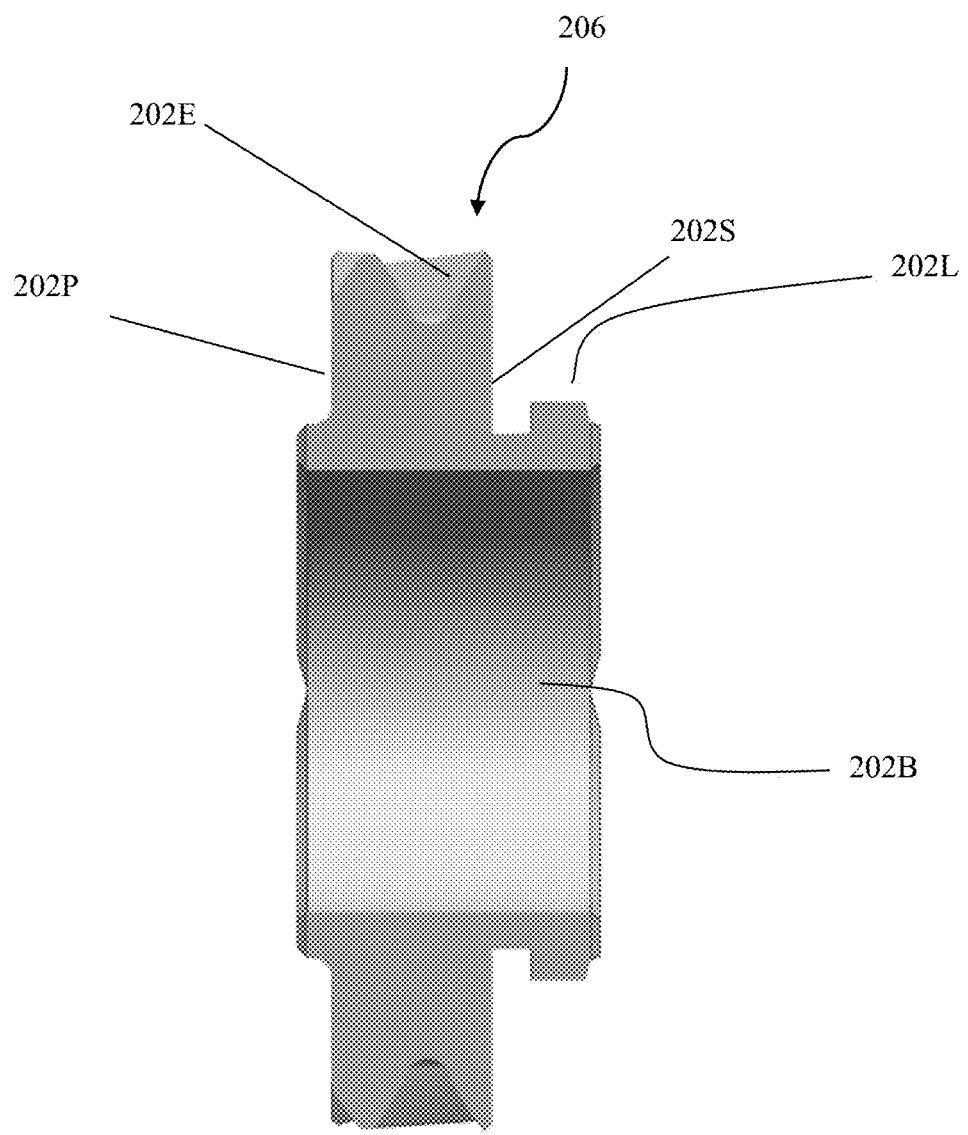
FIG. 3 depicts a cross-sectional view of the transmission actuating gear, according to an embodiment of the invention as disclosed herein.
Figure 4:
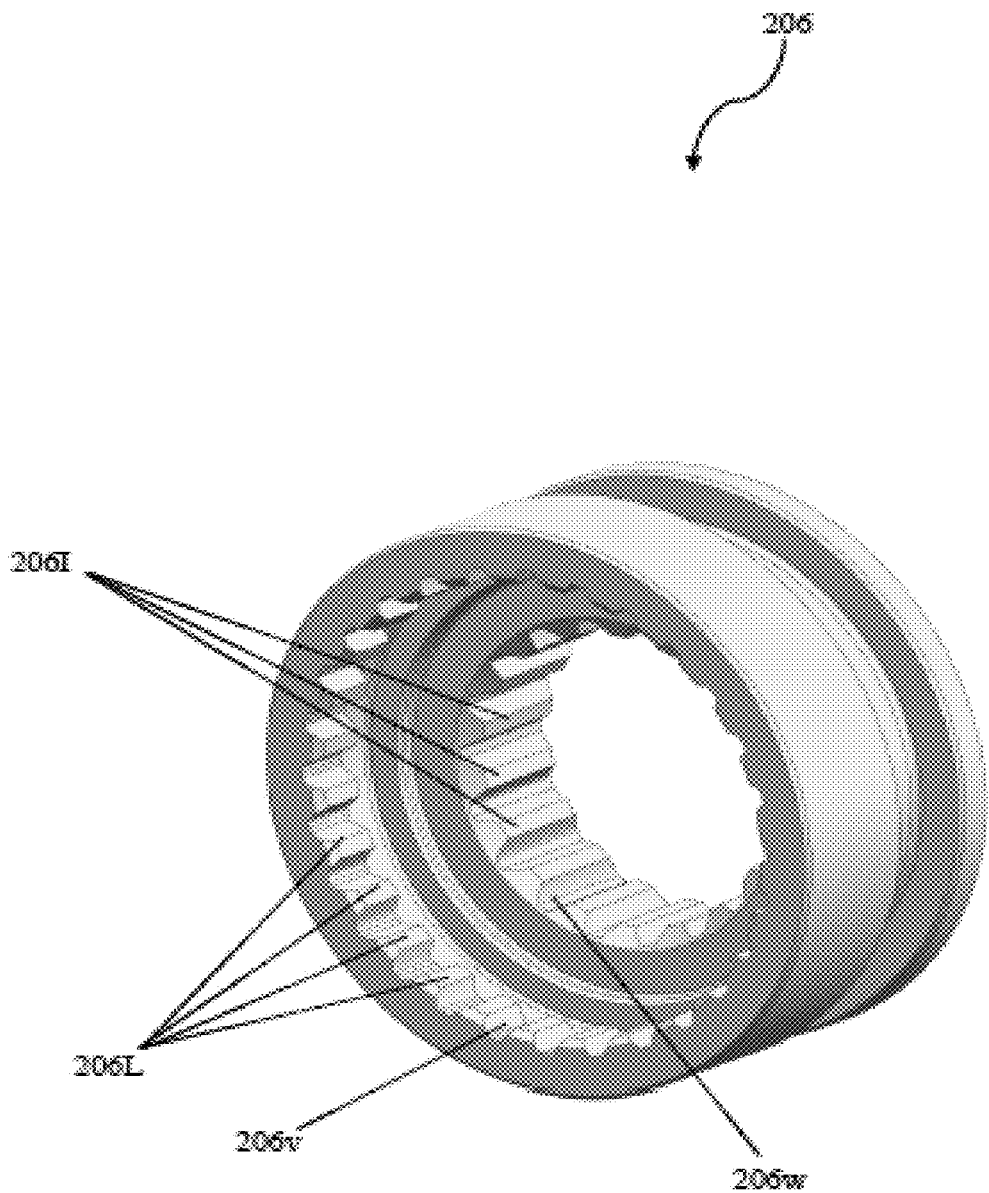
FIG. 4 depicts a perspective view of a gear actuating means (shifter sleeve), according to an embodiment of the invention as disclosed herein.
Figure 5:
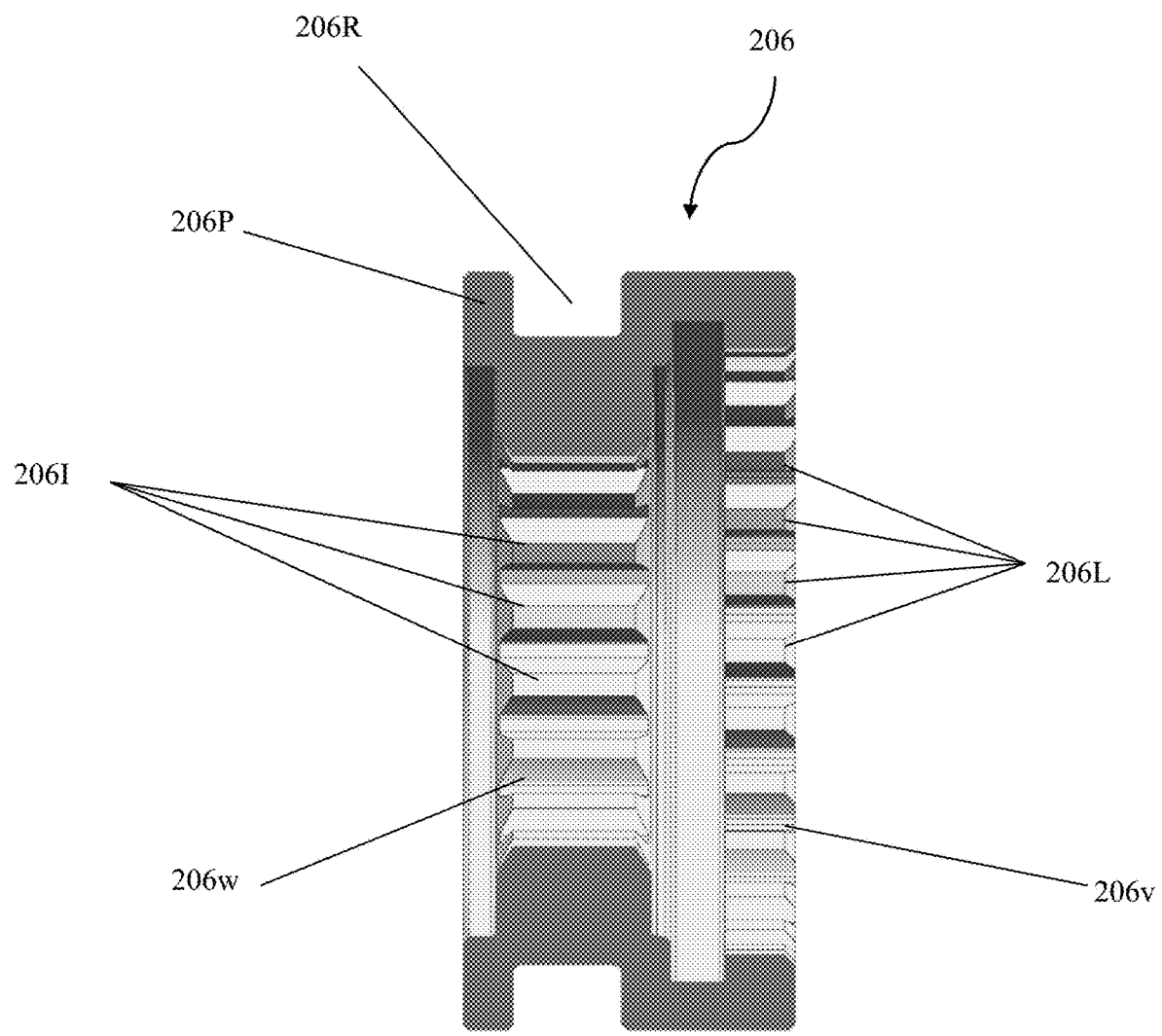
FIG. 5 depicts a cross-sectional view of a gear actuating means (shifter sleeve), according to an embodiment of the invention as disclosed herein.
Figure 6:
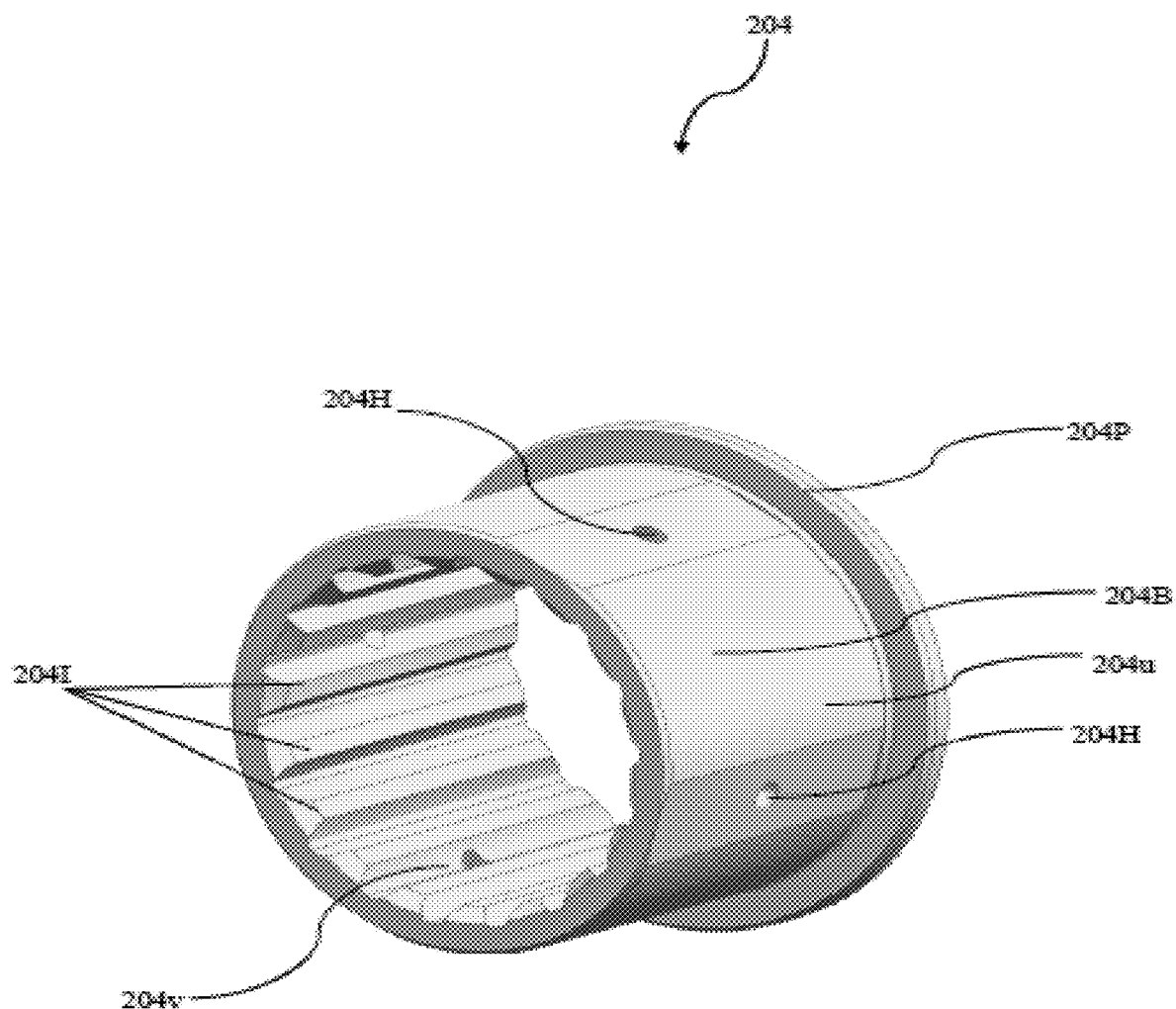
FIG. 6 depicts a perspective view of a gear driven bush, according to an embodiment of the invention as disclosed herein.
Figure 7:
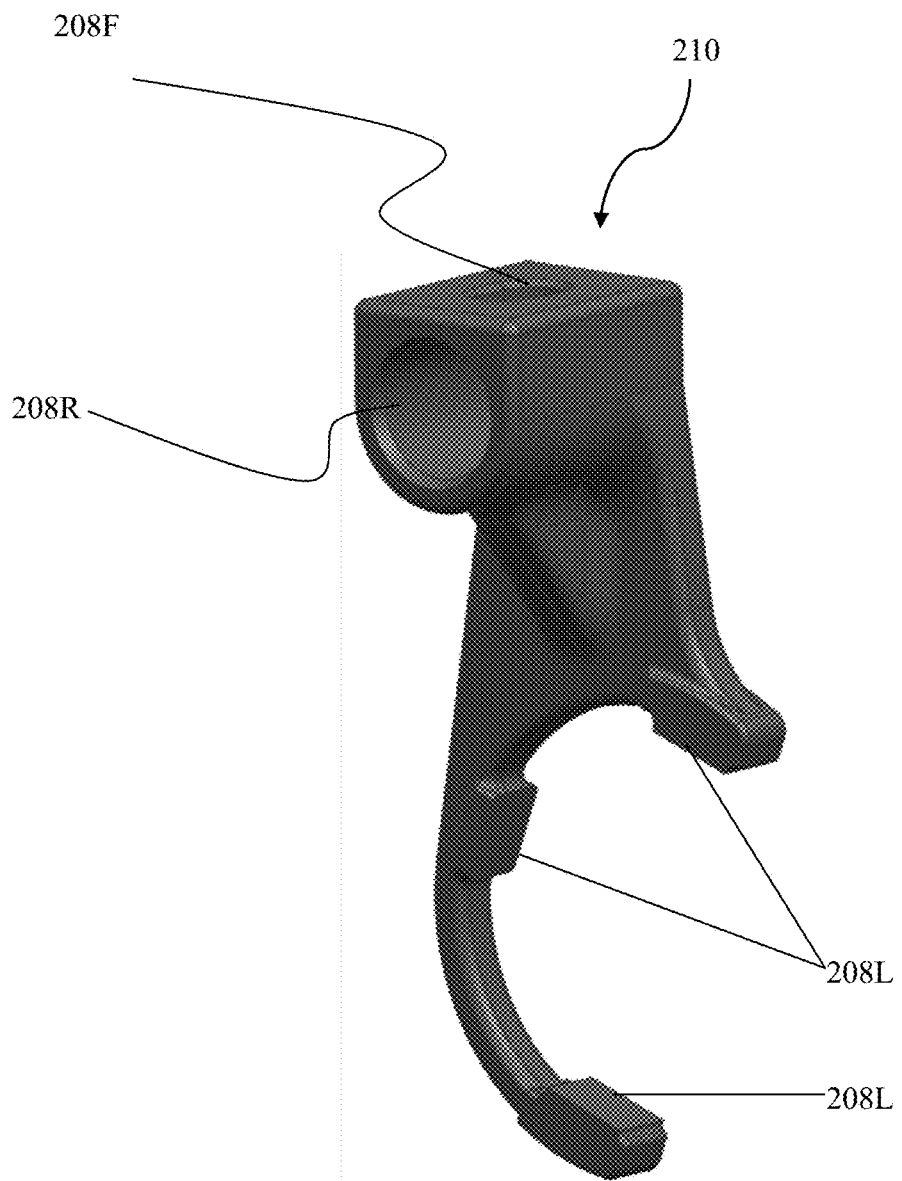
FIG. 7 depicts a perspective view of a shift fork, according to an embodiment of the invention as disclosed herein.
Figure 8:
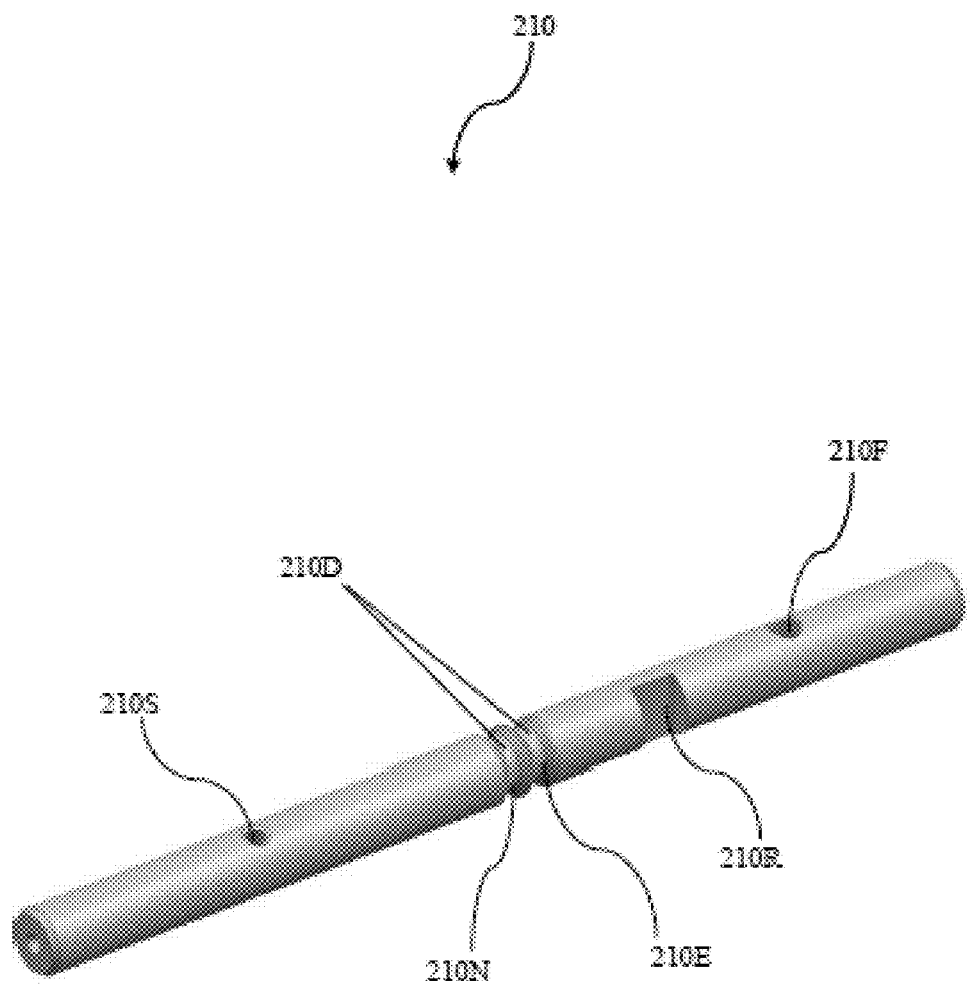
FIG. 8 depicts a perspective view of a shift rail, according to an embodiment of the invention as disclosed herein.
Figure 9:
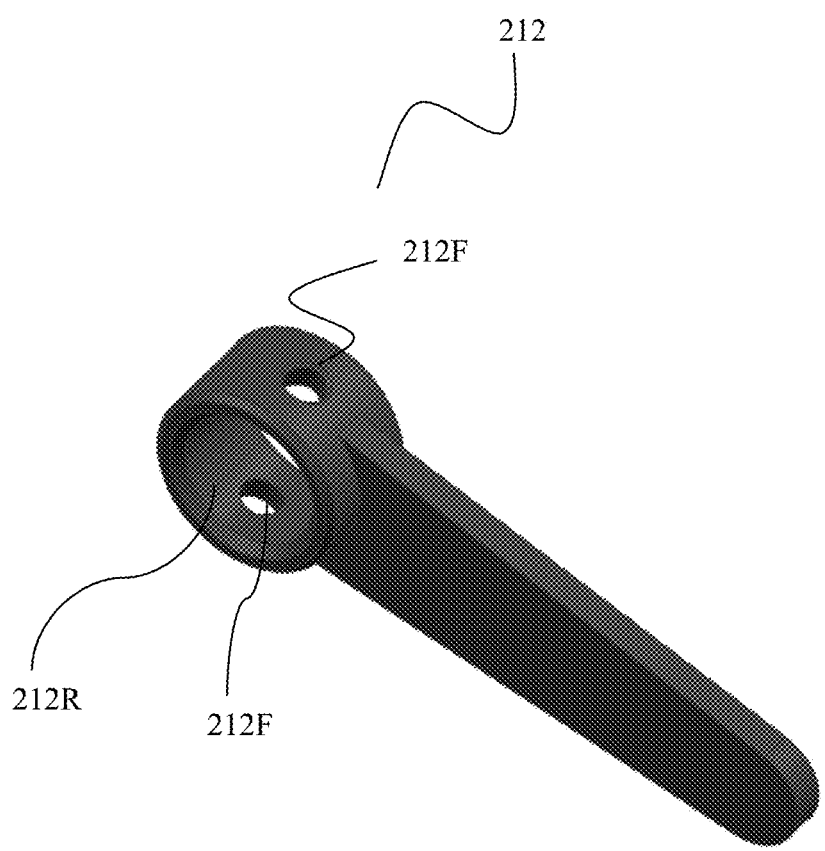
FIG. 9 depicts a perspective view of a clutch control valve actuating arm, according to an embodiment of the invention as disclosed herein.
Figure 10:
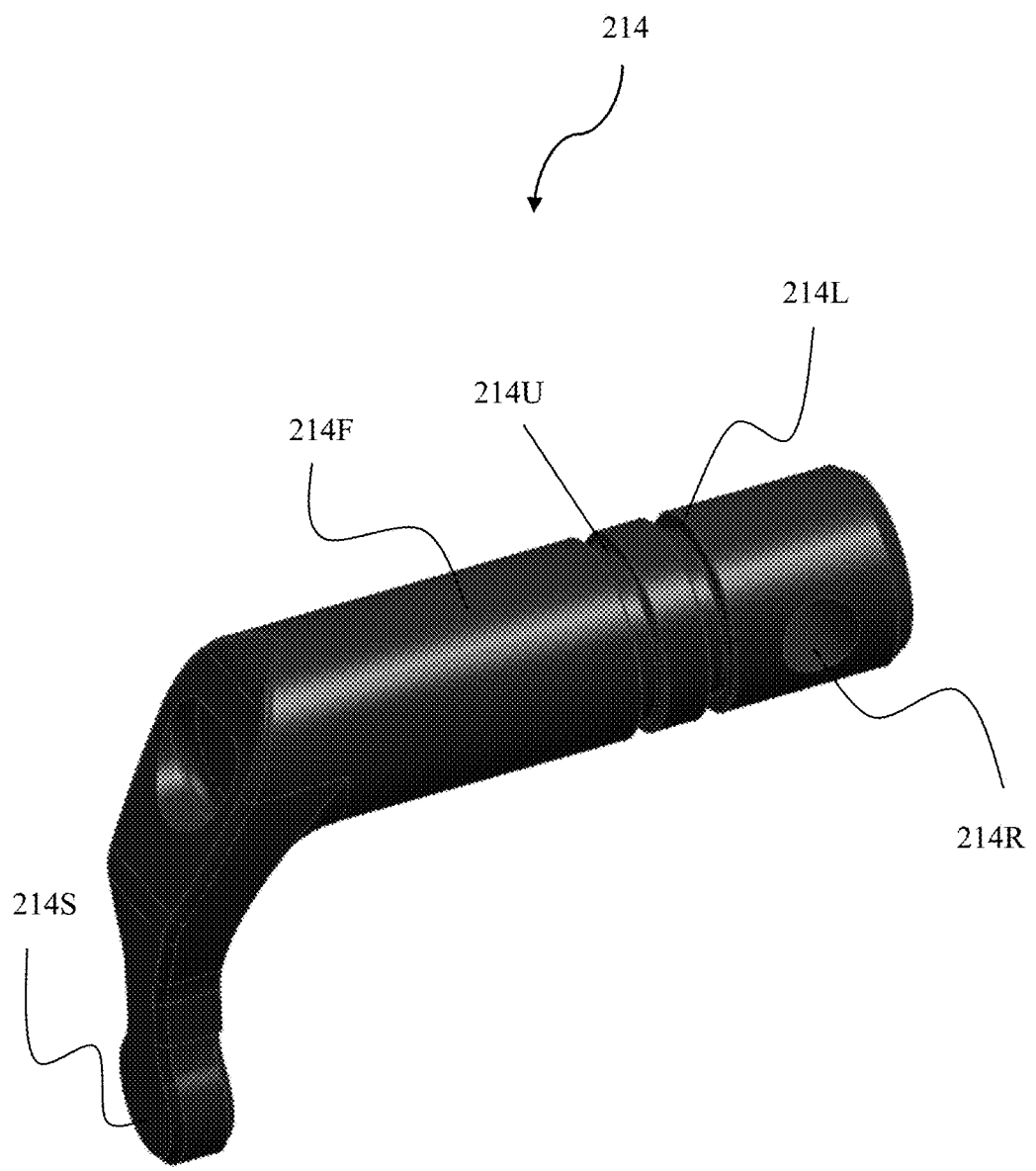
FIG. 10 depicts a perspective view of a rail shifting means, according to an embodiment of the invention as disclosed herein.
Figure 11:
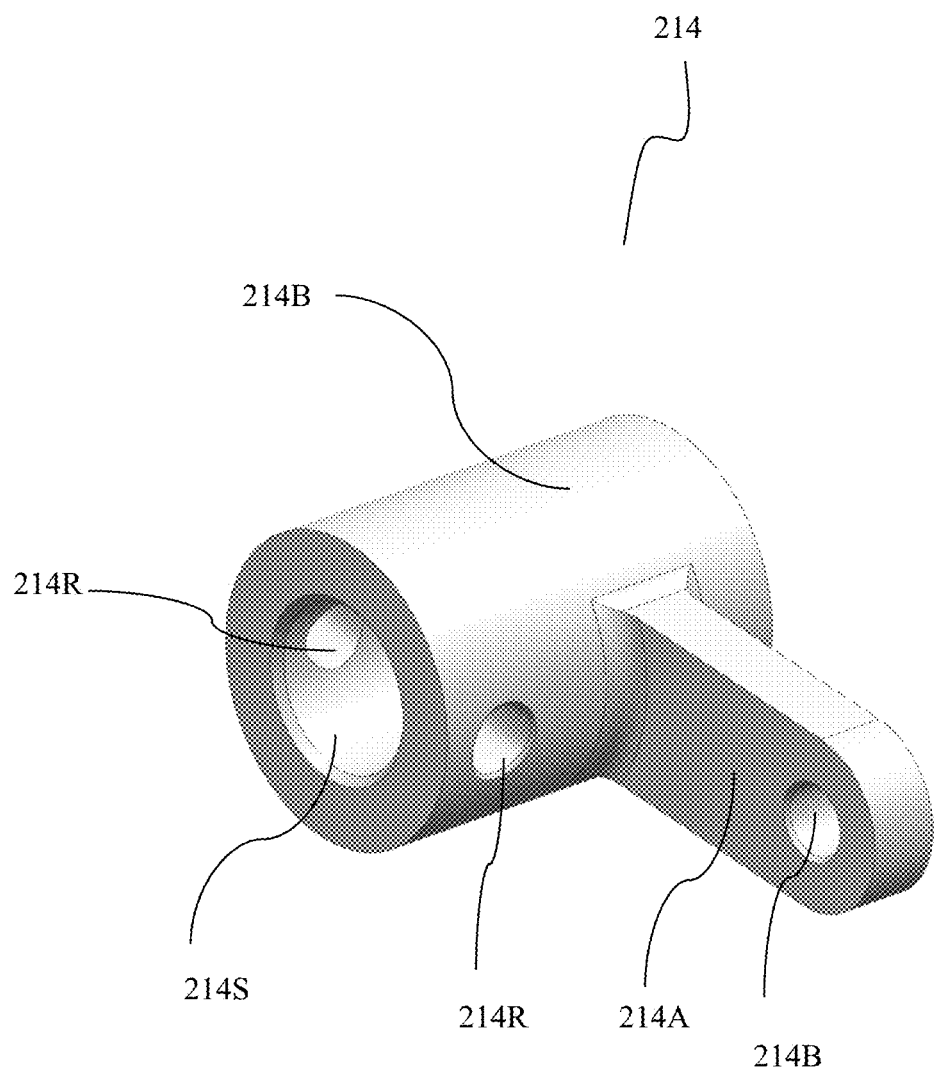
FIG. 11 depicts a perspective view of a rail shifter turn link, according to an embodiment of the invention as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve an auxiliary transmission actuation mechanism (can be considered as tow start mechanism/manual transmission starting mechanism) in a manual dual clutch power transmission unit of a vehicle (tractor, constructional vehicle and the like), which actuates the power transmission unit (drives an output shaft of a multi-speed transmission unit in the power transmission unit) therein to transmit the power from an engine to the wheels of the vehicle thereby propelling the vehicle when at least one of a hydraulic dual clutch unit (dual wet clutch) of the power transmission unit and a hydraulic system of the vehicle is not functioning or working. Referring now to the drawings, and more particularly to FIGS. 1 through 13, where similar reference characters denote corresponding features consistently throughout the figures, there are shown embodiments.

FIG. 1 depicts a perspective view of an auxiliary transmission actuation mechanism 200 in a power transmission unit of a vehicle, according to an embodiment of the invention as disclosed herein. In an embodiment, the vehicle (not shown) includes a manual dual clutch power transmission unit, a master clutch control valve assembly 100M, an engine (not shown), a hydraulic system (not shown) and may include other standard components and/or systems as present in a standard vehicle. In an embodiment, the manual dual clutch power transmission unit includes an auxiliary transmission actuation mechanism 200, a main drive shaft, a clutch shaft, a synchro-shuttle transmission unit, a dual clutch unit, a multi-speed transmission unit and may include other standard components as present in a standard power transmission unit. In an embodiment, the auxiliary transmission actuation mechanism 200 can be considered as tow start mechanism (transmission starting mechanism), which is used to actuate the power transmission unit herein to enable transfer of power from the engine (not shown) to an output shaft of the multi-speed transmission unit in power transmission unit thereby propelling the vehicle when at least one of the dual clutch unit and the hydraulic system (not shown) is not functioning/working. In an embodiment, the auxiliary transmission actuation mechanism 200 (tow start mechanism/transmission starting mechanism) includes a transmission actuating gear 202, a gear driven bush 204, a gear actuating means 206, a shift fork 208, a shift rail 210 (also called as shifter rod), a clutch control valve actuating arm 212, a rail shifting means 214, a rail shifter turn link 216, a coupler 218, an auxiliary transmission actuating shift lever 220, a rail shifter locking means 222, a spacer 224, a detent engaging element 226, a spring 228, a spring retainer 230 and a circlip (not shown). It is also within the scope of the invention to practice/implement the components (parts) of the auxiliary transmission actuation mechanism (tow start mechanism/transmission starting mechanism) 200 and other components of the power transmission unit in an automatic power transmission unit, an automated manual power transmission unit, a hydro-static power transmission unit or any other type of power transmission unit incorporating any other type of shifting mechanisms. For the purpose of this description and ease of understanding, the auxiliary transmission actuation mechanism 200 (tow start mechanism/transmission starting mechanism) in the manual dual clutch power transmission unit is explained herein below with reference to be provided in a tractor. However, it is also within the scope of the invention to implement/practice the auxiliary transmission actuation mechanism 200 (tow start mechanism/transmission starting mechanism) and the components of the power transmission unit in a constructional vehicle, a heavy duty vehicle, an off-road vehicle and/or any other type of vehicle without otherwise deterring the intended function of the auxiliary transmission actuation mechanism 200 (tow start mechanism/transmission starting mechanism) in the manual dual clutch power transmission unit as can be deduced from the description and corresponding drawings.

The transmission actuating gear 202 (as shown in fig.) is mounted onto at least one of the even shaft and the odd shaft of the multi-speed transmission unit through the transmission actuating gear driven bush 204 at a predetermined position and rotatably connected to a forward drive gear of the synchro-shuttle transmission unit, where the forward drive gear of the synchro shuttle transmission unit is mounted onto the clutch shaft of the power transmission unit at a predetermined position. The transmission actuating gear 202 is provided at a predetermined distance from at least one of the even shaft and the odd shaft of the multi-speed transmission unit in the power transmission unit. In an embodiment, the transmission actuating gear 202 can be considered as tow start gear (transmission starting gear), which is used to actuate the power transmission unit therein to transmit the power from the engine (not shown) to an output shaft of the multi-speed transmission unit in the power transmission unit thereby propelling the vehicle when at least one of the dual clutch unit and the hydraulic system (not shown) of the vehicle is not functioning or working i.e., the transmission actuating gear 202 (tow start gear/transmission starting gear) drives at least one of the even shaft and the odd shaft of the multi-speed transmission unit on engagement of the gear actuating means 206 with the transmission actuating gear 202 thereby facilitating transfer of power from the main drive shaft (main drive shaft receives power from engine) to at least one of the even shaft and odd when at least one of the forward drive gear and reverse drive gear is in actuated position/engaged position (engagement of forward and reverse synchronizer unit with at least one of the forward drive gear and reverse drive gear of the synchro-shuttle transmission unit), and at least one of the even shaft and odd shaft which in turn drives at least one of an even drive gear and an odd drive gear respectively which in turn drives the output shaft through an odd and even driven gear on engagement of corresponding synchronizer unit with the at least one of even drive gear and odd drive gear respectively to transmit the power to the output shaft thereby facilitating propulsion of the vehicle when at least one of the dual clutch unit and the hydraulic system of the vehicle is not functioning/working. In an embodiment, the transmission actuating gear 202 defines a plurality of external teeth 202E, a plurality of locking elements 202L, a side portion 202S, another side portion 202P and a bush receiving portion 202B. The plurality of external teeth 202E (can be considered as external splines) of the transmission actuating gear 202 are provided in engagement (constant mesh) with corresponding plurality of external teeth (external splines) of the forward drive gear of the synchro-shuttle transmission unit. In an embodiment, the plurality of locking elements 202L of the transmission actuating gear 202 (tow start gear/transmission starting gear) is adapted to be engaged by the gear actuating means 206 on movement of the gear actuating means 206 from a neutral position (N) to an auxiliary transmission actuation gear position (T, can be considered as tow start gear position/transmission starting gear position) in a direction towards the transmission actuating gear 202 thereby facilitating actuation (engagement) of the transmission actuating gear 202 therein to enable the transmission actuating gear 202 to drive the even shaft through the gear actuating means 206 thereby transmitting the power from the main drive shaft 10M (main drive shaft receives power from engine) to the even shaft of the multi-speed transmission unit when forward drive gear of the synchro-shuttle power transmission unit 10S in in actuated position/engaged position (engagement of forward and reverse synchronizer unit with the forward drive gear of the synchro-shuttle transmission unit), and the even shaft drives the second drive gear which in turn drives the output shaft through the first and second driven gear (first and second speed driven gear) on engagement of corresponding synchronizer unit with the second drive gear (second speed drive gear) to transmit the power to the output shaft thereby propelling the vehicle when at least one of the dual clutch unit and the hydraulic system of the vehicle is not functioning/working. The plurality of locking elements 202L of the transmission actuating gear 202 is adapted to extend from the side portion 202S of the transmission actuating gear 202. In an embodiment, plurality of locking elements 202L of the transmission actuating gear 202 can be considered to be a plurality of external teeth (external splines). The bush receiving portion 202B of the transmission actuating gear 202 is adapted to receive the transmission actuating gear driven bush 204 thereby facilitating mounting of the transmission actuating gear 202 onto the even shaft through the transmission actuating gear driven bush 204 at a predetermined position. The bush receiving portion 202B of the transmission actuating gear 202 can be considered as a bore/opening. In an embodiment, the transmission actuating gear 202 is a helix gear. It is also within the scope of the invention to provide the auxiliary transmission actuation mechanism 200 with any other type of gears to act (serve) as transmission actuating gear 202.

Figure 12:
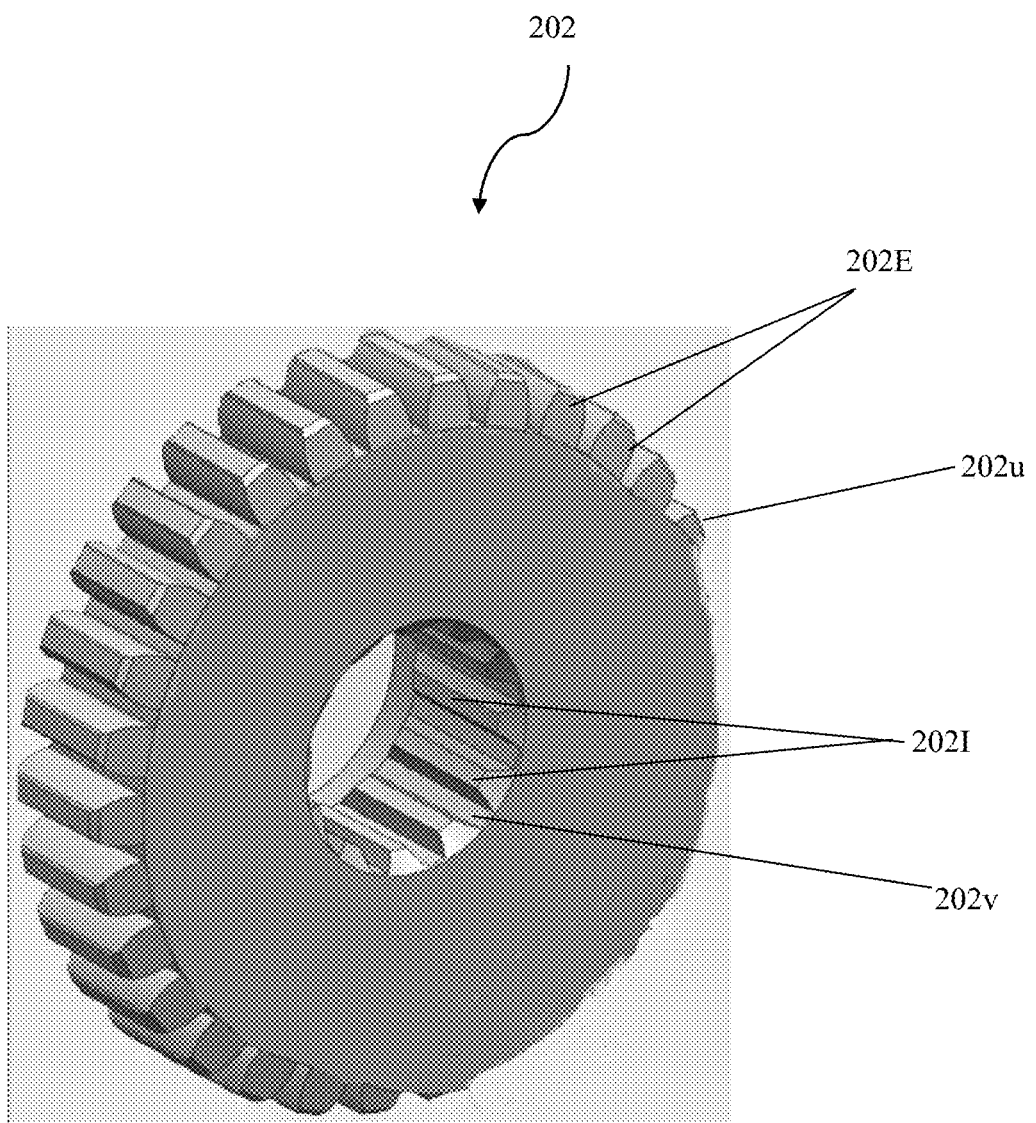
FIG. 12 depicts a perspective view of the transmission actuating gear, according to another embodiment of the invention as disclosed herein.
Figure 13:
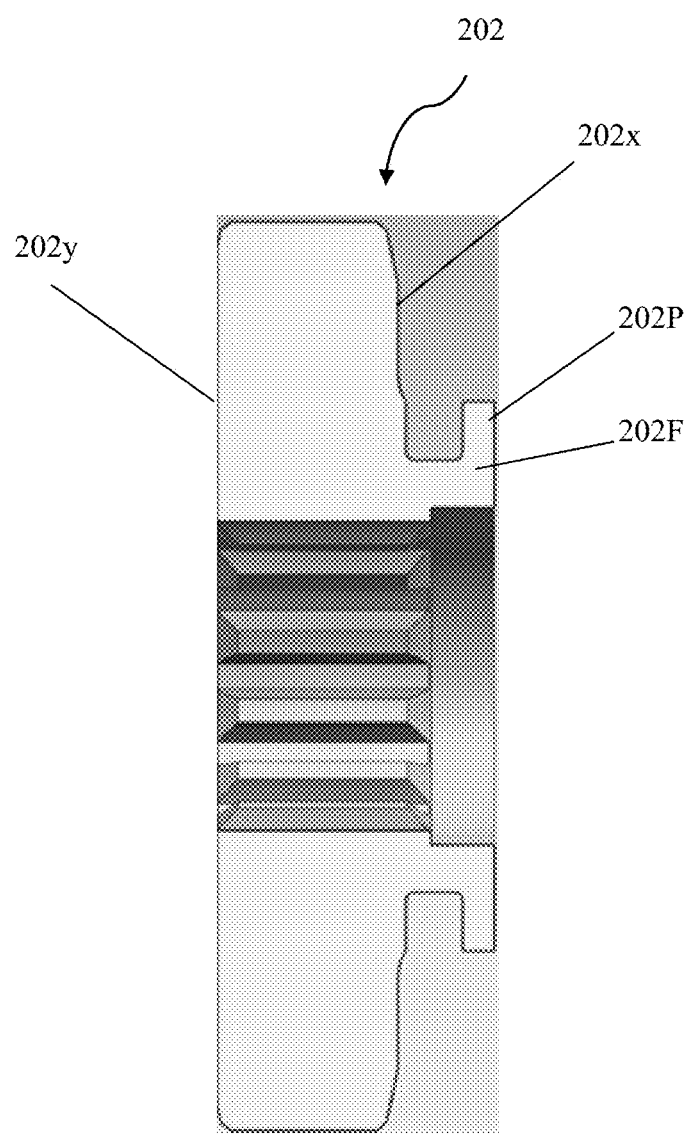
FIG. 13 depicts a cross-sectional view of the transmission actuating gear, according to another embodiment of the invention as disclosed herein.

In another embodiment, the transmission actuating gear 202 (as shown in FIGS. 12 and 13) is movably (slidably) connected to the even shaft of the multi-speed transmission unit. The transmission actuating gear 202 is selectively engaged with the forward drive gear of the synchro-shuttle transmission unit. In another embodiment, the transmission actuating gear 202 (as shown in FIGS. 12 and 13) can be considered as tow start gear (transmission starting gear), which is used to actuate the power transmission unit therein to transmit the power from the engine (not shown) to the output shaft of the multi-speed transmission unit in the power transmission unit 10 thereby propelling the vehicle when at least one of the dual clutch unit and the hydraulic system (not shown) of the vehicle is not functioning or working i.e., the transmission actuating gear 202 (as shown in FIG. 12, tow start gear/transmission starting gear) drives the even shaft of the multi-speed transmission unit on engagement of the transmission actuating gear 202 with the forward drive gear of the synchro-shuttle transmission unit which occurs on movement of the transmission actuating gear 202 from the neutral position (N) to the auxiliary transmission actuating gear position (T) therein to enable engagement of the transmission actuating gear 202 with the forward drive gear thereby facilitating actuation of the transmission actuating gear 202 to transfer the power from the main drive shaft 10M to the even shaft when the forward drive gear is in actuated position/engaged position (engagement of forward and reverse synchronizer unit with the forward drive gear of the synchro-shuttle transmission unit), and the even shaft drives the second drive gear (second speed drive gear) which in turn drives the output shaft through the first and second driven gear (first and second speed driven gear) on engagement of corresponding synchronizer unit with the second drive gear to transmit the power to the output shaft thereby propelling the vehicle when at least one of the dual clutch unit and the hydraulic system of the vehicle is not functioning/working. In another embodiment, the transmission actuating gear 202 (as shown in fig.) defines a plurality of external teeth 202E, a plurality of internal teeth 202I, an outer portion 202$u$, an inner portion 202$v$, a side portion 202$x$, another side portion 202$y$ and a first portion 202F. The plurality of external teeth 202E (external splines) of the transmission actuating gear 202 are provided to an outer portion 202$u$ (outer diameter) of the transmission actuating gear 202 along the circumference of the outer portion 202$u$ (outer diameter) of the transmission actuating gear 202, and extends between the side portion 202$x$ and another side portion 202$y$ of the transmission actuating gear 202. The plurality of external teeth 202E (external splines) of the transmission actuating gear 202 are adapted to engage corresponding plurality of external teeth of the forward drive gear on movement of the transmission actuating gear 202 (as shown in fig.) from the neutral position (N) to the auxiliary transmission actuation gear position (T, can be considered as tow start gear position) thereby facilitating actuation (engagement) of the transmission actuating gear 202 therein to enable the transmission actuating gear 202 to drive the even shaft to transmit the power from the main drive shaft 10M (main drive shaft receives power from engine) to the even shaft of the multi-speed transmission unit when forward drive gear of the synchro-shuttle power transmission unit 10S in in actuated position/engaged position (engagement of forward and reverse synchronizer unit with the forward drive gear of the synchro-shuttle transmission unit), and the even shaft drives the second drive gear (second speed drive gear) which in turn drives the output shaft through the first and second driven gear (first and second speed driven gear) on engagement of corresponding synchronizer unit with the second drive gear (second speed drive gear) to transmit the power to the output shaft thereby propelling the vehicle when at least one of the dual clutch unit and the hydraulic system of the vehicle is not functioning/working. The plurality of internal teeth 202I of the transmission actuating gear 202 are provided to the inner portion 10v (inner diameter) of the transmission actuating gear 202 along the circumference of the inner portion 202v (inner diameter) of the transmission actuating gear 202, and extends between the side portion 202x and another side portion 202y of the transmission actuating gear 202. The plurality of internal teeth 202I of the transmission actuating gear 202 is adapted to movably engaged (movably connected) to corresponding plurality of external teeth of the even shaft. The plurality of internal teeth 202I of the transmission actuating gear 202 is adapted to facilitate movement of the transmission actuating gear 202 on the even shaft from the neutral position (N) to the auxiliary transmission actuation gear position (T) which occurs due to the movement of the shift fork 208 from the neutral position (N) to the auxiliary transmission actuation gear position (T). The first portion 202F of the transmission actuating gear 202 is adapted to extends from corresponding another side portion 202x of the transmission actuating gear 202. The first portion 202F of the transmission actuating gear 202 defines a portion 202P and a shift fork lug receiving portion 202L. The portion 202P of the first portion 202F is radially extending along the circumference of the first portion 202F, where the portion 202P is at least a locking collar (stopper) adapted to restrict the releasing of the shift fork 208 from the transmission actuating gear 202. The shift fork lug receiving portion 202L of the first portion 202F is between corresponding side portion 10x of the transmission actuating gear 202 and the portion 202P of the first portion 202F of the transmission actuating gear 202, where the shift fork lug receiving portion 202L is adapted to receive a plurality of lugs 208L (as shown in fig.) of the shift fork 208 therein to facilitate engagement of the plurality of lugs 202L of the shift fork 208 with corresponding side portion 10x of the transmission actuating gear 202 and the portion 202P of the first portion 202F of the transmission actuating gear 202. The shift fork lug receiving portion 202L of the first portion 202F of the transmission actuating gear 202 can be considered to be a groove (circumferential groove) provided on the first portion 202F between the side portion 10x of transmission actuating gear 202 and the portion 202P of the first portion 202F of transmission actuating gear 202. In another embodiment, the transmission actuating gear 202 (as shown in fig.) is a spur gear. It is also within the scope of the invention to provide the auxiliary transmission actuation mechanism 200 with any other type of gears to act (serve) as transmission actuating gear 202. The aforementioned transmission actuating gear 202 (as shown in fig.) eliminates the usage of the gear driven bush 204, the gear actuating means 206, the spacer 224 and circlip (not shown).

The transmission actuating gear driven bush 204 is used to mount the transmission actuating gear 202 (as shown in fig.) onto the even shaft at a predetermined position therein to restrict the transfer of power from the forward drive gear of the synchro-shuttle transmission unit to the even shaft of the multi-speed transmission unit through the transmission actuating gear 202 when the transmission actuating gear 202 is in de-actuated position (non-engaged position), and at least one of the gear actuating means 206 and the auxiliary transmission actuating shift lever 220 is not in the auxiliary transmission actuation gear position (T). The transmission actuating gear driven bush 204 includes a body 204B and a portion 204P. The body 204B of the transmission actuating gear driven bush 204 is adapted to facilitate mounting of the transmission actuating gear 202 thereby mounting the transmission actuating gear 202 to the even shaft of the multi-speed transmission unit at a predetermined position. The body 204B of the transmission actuating gear driven bush 204 defines a plurality of internal splines 204I corresponding to the plurality of external splines of the even shaft. The plurality of internal splines 204I of the body 204B of the transmission actuating gear driven bush 204 are provided to an inner portion 204v (inner diameter) of the body 204B of the transmission actuating gear driven bush 204 along the circumference of the inner portion 204v (inner diameter) of body 204B of the transmission actuating gear driven bush 204 and extends between corresponding side portions of the transmission actuating gear driven bush 204. The body 204B of the transmission actuating gear driven bush 204 defines a plurality of lubrication passages 204H adapted to facilitate flow of the lubricant therethrough. The plurality of lubrication passages 204H of the body 204B of the transmission actuation gear driven bush 204 at corresponding predetermined positions, and extends from the outer portion 204u to the inner portion 204v of the body 204B of the transmission actuation gear driven bush 204. The plurality of lubrication passages 204H of the body 204B of the transmission actuation gear driven bush 204 can considered to be a hole/opening. The outer portion 204u (outer diameter) of the body 204B of the transmission actuating gear driven bush 204 is grinded, where the transmission actuating gear 202 is mounted onto the outer portion 204u (outer diameter) of the body 204B of the gear driven bush 204. The portion 204P of the transmission actuating gear driven bush 204 is radially extending along the circumference of corresponding end of the body 204B of the transmission actuating gear driven bush 204, where the portion 204P is at least a locking collar (stopper) adapted to restrict the linear movement of the transmission actuating gear 202 thereby restricting the releasing of the transmission actuating gear 202 from the transmission actuating gear driven bush 204.

The gear actuating means 206 can be considered to be a shifter sleeve. The gear actuating means 206 is used to facilitate actuation (engagement) of the transmission actuating gear 202 i.e., the gear actuating means 206 moves from the neutral position (N) to the auxiliary transmission actuation gear position (T) in a direction towards the transmission actuating gear 202 therein to enable engagement of the gear actuating means 206 with the transmission actuating gear 202 (as shown in fig.) thereby facilitating actuation of the transmission actuating gear 202 in response to the movement of the shift fork 208 from the neutral position (N) to the auxiliary transmission actuation gear position (T). In an embodiment, the gear actuating means 206 defines a plurality of locking elements 206L corresponding to the plurality of locking elements 202L (as shown in fig.) of the transmission actuating gear 202. The plurality of locking elements 206L of the gear actuating means 206 are adapted to engage corresponding plurality of locking elements 202L of the transmission actuating gear 202 therein to facilitate actuation of the transmission actuating gear 202 on movement of the gear actuating means 206 from the neutral position (N) to the auxiliary transmission actuation gear position (T) which occurs due to the movement of the shift fork from the neutral position (N) to the auxiliary transmission actuation gear position (T). The plurality of locking elements 206L of the gear actuating means 206 can be considered to be plurality of internal teeth (internal splines).

The plurality of locking elements 206L (internal splines) of the gear actuating means 206 are provided to an inner portion 206v of the gear actuating means 206. The gear actuating means 206 defines a plurality of internal teeth 206I corresponding to the plurality of external teeth of the even shaft of the multi-speed transmission unit. The plurality of internal teeth 206I of the gear actuating means 206 is movably (slidably) connected to corresponding plurality of external teeth of the even shaft. The plurality of internal teeth 206I of the gear actuating means 206 is adapted to facilitate movement of the gear actuating means 206 on the even shaft from the neutral position (N) to the auxiliary transmission actuation gear position (T) which occurs due to the movement of the shift fork 208 from the neutral position (N) to the auxiliary transmission actuation gear position (T). The plurality of internal teeth 206I of the gear actuating means 206 is provided to another inner portion 206w (inner diameter) of the gear actuating means 206. The gear actuating means 206 defines a portion 206P which is provided to the gear actuating means 206 at a predetermined position (can be considered as corresponding end of the gear actuating means 206). The portion 206P of the gear actuating means 206 is radially extending along the circumference of corresponding end of the gear actuating means 206, where the portion 202P is at least a locking collar (stopper) adapted to restrict the releasing of the shift fork 208 from the gear actuating means 208. The gear actuating means 206 defines a shift fork lug receiving portion 206R provided to the gear actuating means 206 at a predetermined position. The shift fork lug receiving portion 206R of the gear actuating means 206 is used to receive a plurality of lugs 208L (as shown in fig.) of the shift fork 208 therein to facilitate engagement of the plurality of lugs 202L of the shift fork 208 with the gear actuating means 208. The shift fork lug receiving portion 206R of the gear actuating means 206 can be considered to be a groove (circumferential groove).

The shift fork 208 is used to move the gear actuating means 206 (shifter sleeve) from the neutral position (N) to the auxiliary transmission actuation gear position (T) in a direction towards the transmission actuating gear 202 therein to facilitate engagement of the plurality of locking elements 206L (internal teeth/internal splines) of the gear actuating means 206 with corresponding plurality of locking elements 202L (external teeth/external splines) thereby actuating the transmission actuating gear 202 in response to the movement of the shift rail 210 along a predefined direction. The shift fork 208 is connected to the shifter rail 210 at a predetermined position. The shift fork 208 includes a plurality of lugs 208L, a shift rail receiving portion 208R and a fastener receiving portion 208F. The plurality of lugs 208L of the shift fork 208L is adapted to be received by the shift fork lug receiving portion 206R of the gear actuating means 206 thereby connecting the shift fork 208 to the gear actuating means 206 (shifter sleeve). The shift rail receiving portion 208R of the shift fork 208 is used to receive corresponding portion of the shift rail 210. The shift rail receiving portion 208R of the shift fork 208 can be considered to be a bore/opening. The fastener receiving portion 208F of the shift fork 208 is used to receive a fastener (not shown) therethrough therein to facilitate secure mounting of the shift fork 208 onto the shift rail 210. The fastener receiving portion 208F of the shift fork 208 can be considered to be a hole/an opening.

The shift rail 210 (shifter rod) is adapted to move along a predefined direction thereby moving the shift fork 208 and the gear actuating means 210 from the neutral position (N) to the auxiliary transmission actuation gear position (T) in response to the movement of the rail shifting means 214 in a predefined direction (anti-clockwise direction). The shift rail 210 includes a rail shifter receiving portion 210R, a first fastener receiving portion 210F, a second fastener receiving portion 210S and a plurality of detents 210D. The rail shifter receiving portion 210R of the shift rail 210 is provided to the shift rail 210 at a predetermined position, where the rail shifter receiving portion 210R is used to receive corresponding portion of the rail shifting means 214. The rail shifter receiving portion 210R of the shift rail 210 can be considered to be a groove/slot. The first fastener receiving portion 210F of the shift rail 210 is provide to the shift rail 210 at a predetermined position, where the first fastener receiving portion 210F is used to receive a fastener (not shown) therein to secure the shift fork 208 to the shift rail 210. The first fastener receiving portion 210F of the shift rail 210 can be considered to be a hole/opening. The second fastener receiving portion 210S of the shift rail 210 is provided to the shift rail 210 at a predetermined position, where the second fastener receiving portion 210S is used to receive a fastener (not shown) therein to secure the clutch control valve actuating arm 212 to the shift rail 210. The second fastener receiving portion 210S of the shift rail 210 can be considered to be a hole/opening. The plurality of detents 210D of the shift rail 210 includes a neutral position groove 210N and an engaged position groove 210E. The detent engaging element 226 engages the neutral position groove 210N when at least one of the auxiliary transmission actuating shift lever 220, the shift fork 208 and the gear actuating means 206 are in neutral position and also when the transmission actuating gear 202 is in de-actuated position/dis-engaged position.

The clutch control valve actuating arm 212 is adapted to engage and move a movable member (inching spool/plunger) of the clutch control valve assembly 100V of the master clutch valve assembly C thereby actuating the clutch control valve assembly 100V to de-actuate the dual clutch unit on movement of the shift rail 210 along the predefined direction (anti-clockwise direction). The clutch control valve actuating arm 212 defines a shift rail receiving portion 212R and a fastener receiving portion 212F. The shift rail receiving portion 212R of the clutch control valve actuating arm 212 is used to receive corresponding portion of the shift rail 210. The shift rail receiving portion 212R of the clutch control valve actuating arm 212 can be considered to be a bore/opening. The fastener receiving portion 212F of the clutch control valve actuating arm 212 is used to receive a fastener (not shown) therethrough therein to facilitate secure mounting of the clutch control valve actuating arm 212 onto the shift rail 210. The fastener receiving portion 212F of the clutch control valve actuating arm 212 is at least a bore/opening.

The rail shifting means 214 is connected to the shifter rail 210 at a predetermined position. The rail shifter means 214 is used to shift/move the shifter rail 210 in a predefined direction in response to the movement of the rail shifter turn link 216 along a predefined direction (anticlockwise direction). The rail shifting means 214 includes a first portion 214F and a second portion 214S. The first portion 214F of the rail shifting means 214 defines a roll pin receiving portion 214R, a locking member receiving portion 214L and an oil ring receiving portion 214U. The roll pin receiving portion 214R of the rail shifting means 214 is used to receive a roll pin therein to secure the rail shifter turn link 216 to the first portion 214F of the rail shifting means 214, where the roll pin receiving portion 214R can be considered to be hole/an opening. The locking member receiving portion 214L of the rail shifting means 214 is used to receive corresponding portion of the rail shifter locking means 216 therein to restrict the axial movement of the rail shifting means 214, where the locking member receiving portion 214L of the rail shifting means 214 can be considered to be a groove. The oil ring receiving portion 214U of the rail shifting means 214 is used to receive an oil ring (not shown), where the oil ring receiving portion 214U can be considered to be a groove. The second portion 214S of the rail shifting means 214 is provided to the rail shifter receiving portion 210R of the shifter rail 210 thereby connecting the rail shifting means 214 to the shifter rail 210.

The rail shifter turn link 216 is used to move the rail shifting means 214 along a predefined direction therein to shift/move the shift rail 210 in the predefined direction on movement of the auxiliary transmission actuating shift lever 220 from the neutral position (N) to the auxiliary transmission actuation gear position (T). The rail shifter turn link 216 includes a body 216B and an arm 216A. The body 216B of the rail shifter turn link 216 defines a rail shifter receiving portion 216S and a plurality of roll pin receiving portions 216R. The rail shifter receiving portion 216S of the body 216B of the rail shifter turn link 216 is used to receive the first portion 214F of the rail shifting means 214, and the plurality of roll pin receiving portions 216R are adapted to receive the roll pin therethrough to secure the rail shifter turn link 216 to the rail shifting means 214. The rail shifter receiving portion 216S of the body 216B of the rail shifter turn link 216 can be considered as bore/opening. The roll pin receiving portions 216R of the rail shifter turn link 216 can be considered to be a hole/opening. The arm 216A of the rail shifter turn link 216 is adapted to transversely extend from the body 216B of the rail shifter turn link 216. The arm 216A of the rail shifter turn link 216 defines a fastener receiving portion The working of the auxiliary transmission actuation mechanism 200 in the power transmission unit 10 is as follows. During breakdown condition of the vehicle which occurs due to malfunctioning of the dual clutch unit and/or the hydraulic system of the vehicle, the operator pulls the auxiliary transmission actuation shift lever 220 in an upward direction which causes the rail shifter turn link 216 to move in an anticlockwise direction therein to move the rail shifting means 214 in an anticlockwise direction which in turn moves the shifter rail 210 to move in a predefined direction thereby moving the shift fork 208 and the gear actuating means 206 from a neutral position (N) to the auxiliary transmission actuation gear position (T) in a direction towards the transmission actuating gear 202 therein to enable engagement of the plurality of locking elements 206L of the gear actuating means 206 with corresponding plurality of locking elements 202L of the transmission actuating gear 202 thereby facilitating actuation (engagement) of the transmission actuating gear 202 therein to enable the transmission actuating gear 202 to drive the even shaft through the gear actuating means 206, and the even shaft drives the output shaft through gears of the power transmission unit 10 thereby propelling the vehicle to the service station. Before the actuation of the transmission actuating gear 202, clutch control valve actuating arm 212 is adapted to engage the movable member of said clutch control valve assembly 100V therein to move the movable member of said clutch control valve assembly 100V to a predefined position thereby actuating said clutch control valve assembly 100V to restrict the hydraulic fluid to flow to said dual clutch unit by allowing the hydraulic fluid to flow to a tank of said hydraulic system thereby de-actuating said dual clutch unit on movement of said shift rail 210 along the predefined direction thereby assisting said transmission actuating gear 202 to drive said even shaft on actuation of said transmission actuating gear 202, and said even shaft drives said second drive gear therein to enable said second drive gear to drive said output shaft through said first and second driven gear on engagement of corresponding synchronizer unit with the second drive gear to transmit the power to said output shaft thereby propelling the vehicle when at least one of said dual clutch unit and the hydraulic system of the vehicle is not functioning.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

We claim:

1. An auxiliary transmission actuation mechanism 200 in a manual dual clutch power transmission unit 10 comprising a main drive shaft, a synchro-shuttle transmission unit, a dual clutch unit, and a multi-speed transmission unit having an odd shaft, an even shaft, an odd drive gear, an even drive gear, an odd and even driven gear, an output shaft, said auxiliary transmission actuation mechanism 200 comprising:

a shift fork 208 adapted to be connected to a shift rail 210 at a predetermined position, said shift fork 208 having a plurality of lugs 208L;

a clutch control valve actuating arm 212 adapted to be connected to said shift rail 210 at a predetermined position;

a transmission actuating gear 202 adapted to be mounted onto at least one of said even shaft and said odd shaft through a transmission actuating gear driven bush 112 at a predetermined position and rotatably connected to a forward drive gear of said synchro-shuttle transmission unit, said transmission actuating gear 202 defines a plurality of locking elements 202L;

a gear actuating means 206 adapted to be movably connected to at least one of said even shaft and said odd shaft, said gear actuating means 206 defines a plurality of locking elements 206L corresponding to the plurality of locking elements 202L of said transmission actuating gear 202; and a shift fork lug receiving portion 206R adapted to receive the plurality of lugs 208L of said shift fork 208 thereby connecting said shift fork 208 to said gear actuating means 206;

wherein said clutch control valve actuating arm 212 is adapted to engage a movable member of a clutch control valve assembly 100V therein to move the movable member of said clutch control valve assembly 100V to a predefined position thereby actuating said clutch control valve assembly 100V to de-actuate said dual clutch unit on movement of said shift rail 210 along the predefined direction; and moving said shift rail 210 along the predefined direction moves said shift fork 208 and gear actuating means 206 from a neutral position (N) to an auxiliary transmission actuation gear position (T) in a direction towards said transmission actuating gear 202 therein to enable engagement of the plurality of locking elements 206L of said gear actuating means 206 with corresponding plurality of locking elements 202L of said transmission actuating gear 202 thereby facilitating actuation of said transmission actuating gear 202 therein to enable said transmission actuating gear 202 to drive at least one of said even shaft and said odd shaft through said gear actuating means 206 thereby transmitting the power from said main drive shaft 10M to said at least one of said even shaft and said odd shaft of the multi-speed transmission unit respectively when at least one of the forward drive gear and a reverse drive gear of said synchro-shuttle transmission unit is in engaged position, and at least one of said even shaft and said odd shaft drives said even drive gear and said odd drive gear respectively therein to enable at least one of said even drive gear and said odd drive gear to drive said output shaft through said odd and even driven gear on engagement of corresponding synchronizer unit with at least one of said even drive gear and said odd drive gear to transmit the power to said output shaft thereby propelling the vehicle when at least one of said dual clutch unit and the hydraulic system of the vehicle is not functioning.

2. The mechanism 200 as claimed in claim 1, wherein the plurality of locking elements 202L of said transmission actuating gear 202 is at least a plurality of external teeth (splines).

3. The mechanism 200 as claimed in claim 1, wherein the plurality of locking elements 206L of said gear actuating means is at least a plurality of internal teeth (internal splines).

4. The mechanism 200 as claimed in claim 3, wherein the shift fork lug receiving portion 206R of said gear actuating means 206 is at least a groove (circumferential groove).

5. The mechanism 200 as claimed in claim 4, wherein said gear actuating means 206 is a shifter sleeve.

6. The mechanism 200 as claimed in claim 1, wherein said clutch control valve actuating arm 212 is adapted to engage the movable member of said clutch control valve assembly 100V therein to move the movable member of said clutch control valve assembly 100V to a predefined position thereby actuating said clutch control valve assembly 100V to restrict the hydraulic fluid to flow to said dual clutch unit by allowing the hydraulic fluid to flow to a tank of said hydraulic system thereby de-actuating said dual clutch unit on movement of said shift rail 210 along the predefined direction thereby assisting said transmission actuating gear 202 to drive at least one of said even shaft and said odd shaft on actuation of said transmission actuating gear 202, and at least one of said even shaft and odd drives at least one of said even drive gear and odd drive gear respectively therein to enable at least one of said even drive gear and odd drive gear to drive said output shaft through said odd and even driven gear on engagement of corresponding synchronizer unit with at least one of said even drive gear and said odd drive gear respectively to transmit the power to said output shaft thereby propelling the vehicle when at least one of said dual clutch unit and the hydraulic system of the vehicle is not functioning.

7. The mechanism 200 as claimed in claim 1, wherein said even drive gear is at least one of a second drive gear, a fourth drive gear, a sixth drive gear and a eighth drive gear, wherein said even drive gear is adapted to be mounted onto said even shaft through an even drive gear driven bush at corresponding predetermined position.

8. The mechanism 200 as claimed in claim 1, wherein said odd drive gear is at least one of a first drive gear, a third drive gear, fifth drive gear, a seventh drive gear and an eighth drive gear, where said odd drive gear is adapted to be mounted onto said odd shaft through an odd drive gear driven bush at corresponding predetermined position.

9. The mechanism 200 as claimed in claim 1, wherein the odd and even driven gear is at least one of a first and second driven gear, a third and fourth driven gear, a fifth and sixth driven gear, and a seventh and eighth driven gear, where the odd and even driven gear is adapted to be mounted onto said output shaft at corresponding predetermined position.

* * * * *